(12) United States Patent
Yanagisawa et al.

(10) Patent No.: US 11,046,324 B2
(45) Date of Patent: Jun. 29, 2021

(54) DEVICE FOR CONTROLLING VEHICLE EQUIPPED WITH MULTI-STAGE AUTOMATIC TRANSMISSION

(71) Applicant: Mazda Motor Corporation, Hiroshima (JP)

(72) Inventors: Kentaro Yanagisawa, Hiroshima (JP); Ryohei Yasutomi, Hiroshima (JP); Hidemasa Tomiyori, Aki-gun (JP); Hisanobu Okada, Hatsukaichi (JP); Tatsuya Matsukawa, Higashihiroshima (JP); Yukihiro Soeda, Hiroshima (JP); Tatsuo Sasaki, Hiroshima (JP); Daisaku Shiraishi, Hiroshima (JP); Tetsutaka Shibata, Hiroshima (JP); Keiichi Hiwatashi, Higashihiroshima (JP); Yuichiro Akiya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/652,777

(22) PCT Filed: Oct. 1, 2018

(86) PCT No.: PCT/JP2018/036651
§ 371 (c)(1),
(2) Date: Apr. 1, 2020

(87) PCT Pub. No.: WO2019/069843
PCT Pub. Date: Apr. 11, 2019

(65) Prior Publication Data
US 2020/0238994 A1    Jul. 30, 2020

(30) Foreign Application Priority Data

Oct. 3, 2017 (JP) .............................. JP2017-193561

(51) Int. Cl.
*B60W 30/18* (2012.01)
*B60W 10/06* (2006.01)
(Continued)

(52) U.S. Cl.
CPC ........ *B60W 30/1819* (2013.01); *B60W 10/06* (2013.01); *B60W 10/10* (2013.01);
(Continued)

(58) Field of Classification Search
CPC ...... B60W 10/06; B60W 10/08; B60W 10/11; B60W 30/1819; B60W 30/1884;
(Continued)

(56) References Cited

U.S. PATENT DOCUMENTS 6,275,004 B1 * 8/2001 Tamai .................... B60K 6/485
320/118
6,443,277 B1 * 9/2002 Taylor .................. B60W 10/02
192/3.57
(Continued)

FOREIGN PATENT DOCUMENTS

EP        1600629 A2    11/2005
JP     2002206630 A     7/2002
(Continued)

*Primary Examiner* — Edwin A Young
(74) *Attorney, Agent, or Firm* — Alleman Hall Creasman & Tuttle LLP

(57) ABSTRACT

A control device for a multi-stage automatic transmission-equipped vehicle includes a hydraulic power controller, a combustion controller configured to, if a predetermined combustion stop condition is satisfied when the vehicle is traveling, perform deceleration-period combustion stop control, and limit combustion restart triggered by a reduction in rotational speed of an internal combustion engine, during execution of the deceleration-period combustion stop control, and a motoring controller configured to control the rotational drive of the internal combustion engine by a motor (Continued)

during execution of the deceleration-period combustion stop control so that the rotational speed of the internal combustion engine is maintained at a predetermined rotational speed during a period of time from the time that the rotational speed of the internal combustion engine decreases to the predetermined rotational speed until downshifting to a predetermined gear ratio is completed.

4 Claims, 6 Drawing Sheets

(51) Int. Cl.
  *B60W 10/10* (2012.01)
  *F01M 1/02* (2006.01)
  *F02D 41/02* (2006.01)
  *F02D 41/04* (2006.01)
  *F02D 41/06* (2006.01)
  *F02D 41/12* (2006.01)

(52) U.S. Cl.
  CPC ............. *F01M 1/02* (2013.01); *F02D 41/023* (2013.01); *F02D 41/042* (2013.01); *F02D 41/062* (2013.01); *F02D 41/12* (2013.01); *B60W 2510/0638* (2013.01); *F01M 2001/0207* (2013.01); *F01M 2001/0253* (2013.01); *F02D 2200/101* (2013.01); *F02D 2200/602* (2013.01)

(58) Field of Classification Search
  CPC ..... B60W 2510/0638; B60W 2520/105; F02D 41/023; F02D 41/042; F02D 41/062; F02D 41/12
  See application file for complete search history.

(56) References Cited

U.S. PATENT DOCUMENTS

| | | | |
|---|---|---|---|
| 2002/0091034 A1 | 7/2002 | Nakamori et al. | |
| 2002/0179347 A1* | 12/2002 | Tamai | B60W 10/06 180/65.25 |
| 2006/0108163 A1* | 5/2006 | Kitano | B60K 6/485 180/65.26 |

FOREIGN PATENT DOCUMENTS

| | | |
|---|---|---|
| JP | 2005344664 A | 12/2005 |
| JP | 2009243513 A | 10/2009 |
| JP | 6115587 B | 4/2017 |
| WO | 2014080530 A1 | 5/2014 |

* cited by examiner

DEVICE FOR CONTROLLING VEHICLE EQUIPPED WITH MULTI-STAGE AUTOMATIC TRANSMISSION

TECHNICAL FIELD

The present invention relates to a device for controlling a multi-stage automatic transmission-equipped vehicle having a multi-stage automatic transmission including a plurality of friction fastening elements capable of being engaged using hydraulic power supplied from a mechanical oil pump driven by rotation of an internal combustion engine.

BACKGROUND ART

A multi-stage automatic transmission-equipped vehicle (also hereinafter simply referred to as a "vehicle") which has an internal combustion engine (also hereinafter referred to as an "engine") and a multi-stage automatic transmission is typically equipped with a mechanical oil pump which is driven by rotation of the engine. When the engine is being driven, hydraulic power generated by the mechanical oil pump is selectively supplied to a plurality of friction fastening elements provided in the multi-stage automatic transmission (also hereinafter simply referred to as an "automatic transmission"). As a result, in the automatic transmission, the plurality of friction fastening elements are selectively engaged so as to provide a gear ratio corresponding to the vehicle's running condition.

Incidentally, among the known engine control techniques for improving fuel saving performance is a deceleration-period combustion stop control which performs a fuel shut-off (stopping fuel supply to the combustion chamber of the engine) while traveling without the accelerator pedal being pressed. When the deceleration-period combustion stop control is being performed, if the engine rotational speed decreases to a predetermined restart rotational speed, a combustion restart (resumption of fuel supply) is performed in order to avoid an engine stall. Thus, when the vehicle is traveling, the combustion stop and combustion restart of the engine are performed repeatedly, if necessary, depending on the running condition.

In addition, in order to further improve fuel saving performance, vehicle-stopped-period idle stop control systems have in recent years been widely employed that perform a vehicle-stopped-period idle stop control to automatically stop the engine when a vehicle is stopped. A vehicle equipped with a vehicle-stopped-period idle stop control system typically has an electrically-driven oil pump for quickly engaging a start gear ratio friction fastening element when the vehicle starts moving again. In this case, instead of the mechanical oil pump, which is stopped together with the engine, the electrically-driven oil pump can be used to supply hydraulic power to the start gear ratio friction fastening element, resulting in a good start response.

In vehicles equipped with a vehicle-stopped-period idle stop control system, fuel saving performance is improved by the deceleration-period combustion stop control, which is performed during deceleration of the vehicle until the engine rotational speed decreases to the restart rotational speed, and the idle stop control, which is performed when the vehicle is stopped. However, during execution of the deceleration-period combustion stop control, if deceleration is performed by pressing the brake pedal in order to stop the vehicle, the combustion restart is performed at the time that the engine rotational speed decreases to the restart rotational speed. From the time that the combustion restart is performed during deceleration until the vehicle comes to stop and then the idle stop control is started, engine combustion is continued. Therefore, during such a period of time, fuel is consumed irrespective of no request for acceleration from the driver of the vehicle.

Under the above circumstances, the control of limiting the combustion restart which is performed when the engine rotational speed decreases during deceleration for stopping the vehicle has been explored and brought into practical use. Such control allows continuation of the combustion-stopped state from the time that the deceleration-period combustion stop control is started until the vehicle comes to a stop and then starts moving again, resulting in a further improvement in fuel saving performance.

Note that when a control is performed to continue to stop combustion from before the vehicle comes to a stop, it is as though the idle stop control is started before the vehicle comes to a stop. Such a technique of continuing to stop engine combustion during deceleration for stopping the vehicle is sometimes called "deceleration-period idle stop," "non-zero vehicle speed idle stop," etc.

Even when the deceleration-period combustion stop control is being performed, if the vehicle speed is relatively high, the lock-up clutch of the automatic transmission is engaged, or the like, the engine crankshaft is rotated together with the driven wheel, and therefore, the engine rotational speed is maintained relatively high. In such a state, the mechanical oil pump can generate sufficient hydraulic power, and therefore, the automatic transmission can perform appropriate downshifting according to a reduction in vehicle speed.

Meanwhile, when the deceleration-period combustion stop control is being performed, the engine rotational speed may decrease to less than the idle rotational speed due to the reduction of the vehicle speed, the disengagement of the lock-up clutch, etc., so that the mechanical oil pump may no longer generate sufficient hydraulic power. At that time, required hydraulic power is not supplied to any of the friction fastening elements, and therefore, the automatic transmission can no longer perform downshifting according to a reduction in vehicle speed, and is put into substantially a neutral state.

In such a case where the engine combustion is stopped and deceleration is performed with the automatic transmission in neutral, malfunctions caused by the absence of downshifting according to a reduction in vehicle speed may occur, e.g., a reduction in responsiveness of the combustion restart to the driver's reacceleration request.

Under the above circumstances, it may be conceived that when the engine rotational speed decreases during execution of the deceleration-period combustion stop control, an electrically-driven oil pump is driven, and hydraulic power generated by the electrically-driven oil pump is used to perform downshifting according to vehicle speed. However, the electrically-driven oil pump typically supplies hydraulic power to only the start gear ratio friction fastening element. In that case, deceleration cannot be performed at gear ratios higher than the start gear ratio.

Note that, in theory, it may be conceived that a hydraulic circuit is configured to be able to supply hydraulic power generated by the electrically-driven oil pump to friction fastening elements corresponding to all gear ratios. However, in that case, the complexity of the fluid path configuration increases, and the elongation of the fluid path leads to an increase in capacity and size of the electrically-driven oil pump. To begin with, in terms of manufacturing cost, it is not practical to newly configure such a specialized hydraulic circuit.

In contrast to this, Patent Document 1 proposes a hydraulic circuit which can achieve first gear and fourth gear using hydraulic power generated by an electrically-driven oil pump. By employing such a hydraulic circuit, even when the discharge pressure of the mechanical oil pump decreases due to a decrease in engine rotational speed during execution of the deceleration-period combustion stop control, the electrically-driven oil pump can be driven to allow deceleration to be performed not only in first gear but also in fourth gear.

CITATION LIST

Patent Document

PATENT DOCUMENT 1: Japanese Patent No. 6115587

SUMMARY OF THE INVENTION

Technical Problem

However, in the case where the technique of Patent Document 1 is employed, when the hydraulic power of the electrically-driven oil pump is used, the automatic transmission is forced into fourth gear or first gear even during deceleration at a vehicle speed that the automatic transmission normally should be put into second gear or third gear. Thus, the problem in which normal downshifting according to a reduction in vehicle speed cannot be performed during execution of the deceleration-period combustion stop control, is still not solved.

With the above problem in mind, the present invention has been made. It is an object of the present invention to provide a device that is for controlling a multi-stage automatic transmission-equipped vehicle and that can perform normal downshifting according to a reduction in vehicle speed during deceleration for stopping the vehicle while allowing the internal combustion engine to be in the combustion-stopped state until the vehicle comes to stop.

Solution to the Problem

In order to achieve the above object, the present invention is directed to a control device for a multi-stage automatic transmission-equipped vehicle having an internal combustion engine, a mechanical oil pump configured to be driven by rotation of the internal combustion engine, a multi-stage automatic transmission including a plurality of friction fastening elements configured to be engaged using hydraulic power supplied from the mechanical oil pump, and a motor configured to drive the internal combustion engine to rotate. The control device includes: a hydraulic power controller configured to control the hydraulic power supplied to the friction fastening elements; a combustion controller configured to, if a predetermined combustion stop condition is satisfied when the vehicle is traveling, perform a deceleration-period combustion stop control to stop combustion of the internal combustion engine, and limit combustion restart triggered by a reduction in rotational speed of the internal combustion engine, during execution of the deceleration-period combustion stop control; and a motoring controller configured to control the rotational drive of the internal combustion engine by the motor during execution of the deceleration-period combustion stop control so that the rotational speed of the internal combustion engine is maintained at a predetermined rotational speed during a period of time from the time that the rotational speed of the internal combustion engine decreases to the predetermined rotational speed until downshifting to a predetermined gear ratio is completed.

With the above configuration, the rotational speed of the internal combustion engine is maintained at the predetermined rotational speed by motoring for the internal combustion engine until downshifting to the predetermined gear ratio is completed while the deceleration-period combustion stop control is continued during deceleration for stopping the vehicle. Therefore, a normal gear change control employing hydraulic power of the mechanical oil pump can be performed. Therefore, the combustion-stopped state is continued until the vehicle comes to a stop, resulting in an improvement in fuel saving performance, and normal downshifting according to a reduction in vehicle speed can be achieved.

Note that the predetermined rotational speed is preferably such that the mechanical oil pump can generate hydraulic power which is greater than or equal to minimum hydraulic power required for normal control of the multi-stage automatic transmission. Specifically, the predetermined rotational speed is preferably, for example, similar to an idle rotational speed which is obtained in the absence of so-called idle up. In addition, the predetermined gear ratio is not limited to a specific gear ratio, and is preferably higher than a start gear ratio.

In one embodiment of the control device for a multi-stage automatic transmission-equipped vehicle, the multi-stage automatic transmission has an electrically-driven oil pump configured to supply hydraulic power to a predetermined one of the plurality of friction fastening elements configured to be engaged when the gear ratio of the multi-stage automatic transmission is put into the predetermined gear ratio. The hydraulic power controller supplies hydraulic power from the electrically-driven oil pump to the predetermined friction fastening element, during execution of the deceleration-period combustion stop control, after downshifting to the predetermined gear ratio is completed.

Thus, as described above, after downshifting to the predetermined gear ratio is completed using the hydraulic power of the mechanical oil pump, the predetermined gear ratio can be maintained using the hydraulic power of the electrically-driven oil pump.

In the above embodiment, the motoring controller preferably stops the rotational drive of the internal combustion engine by the motor after downshifting to the predetermined gear ratio is completed and the electrically-driven oil pump starts to be driven.

Thus, after downshifting to the predetermined gear ratio is completed and the electrically-driven oil pump starts to be driven, the motoring for the internal combustion engine is ended while deceleration is continued at the predetermined gear ratio for stopping the vehicle, whereby power consumption can be prevented or reduced.

In another embodiment of the control device for a multi-stage automatic transmission-equipped vehicle, the combustion controller is configured to cause the internal combustion engine to restart combustion when the rotational speed of the internal combustion engine decreases to a predetermined restart rotational speed higher than the predetermined rotational speed during execution of the deceleration-period combustion stop control, and limit the combustion restart of the internal combustion engine triggered by the rotational speed of the internal combustion engine becoming lower than or equal to the predetermined restart rotational speed, when a vehicle stop request is made by a driver pressing a brake pedal of the vehicle during execution of the deceleration-period combustion stop control.

Thus, during execution of the deceleration-period combustion stop control, when a vehicle stop request is not made by the driver, the combustion restart is performed when the rotational speed of the internal combustion engine decreases to the restart rotational speed, and therefore, the stall of the internal combustion engine can be avoided. Meanwhile, by limiting the combustion restart during deceleration for stopping the vehicle, a continuous combustion-stopped state can be achieved from the time that the deceleration-period combustion stop control is started at least until the vehicle comes to stop (in the case where the vehicle-stopped-period idle stop is performed, until the internal combustion engine is restarted in response to a request to start moving again made by the driver). As a result, fuel saving performance can be effectively improved.

Advantages of the Invention

As described above, in the control device for a multi-stage automatic transmission-equipped vehicle according to the present invention, when deceleration for stopping a vehicle is performed, the combustion-stopped state of the internal combustion engine is continued until the vehicle comes to stop, resulting in an improvement in fuel saving performance, and normal downshifting according to a reduction in vehicle speed can be achieved.

DESCRIPTION OF EMBODIMENTS

Figure 1:
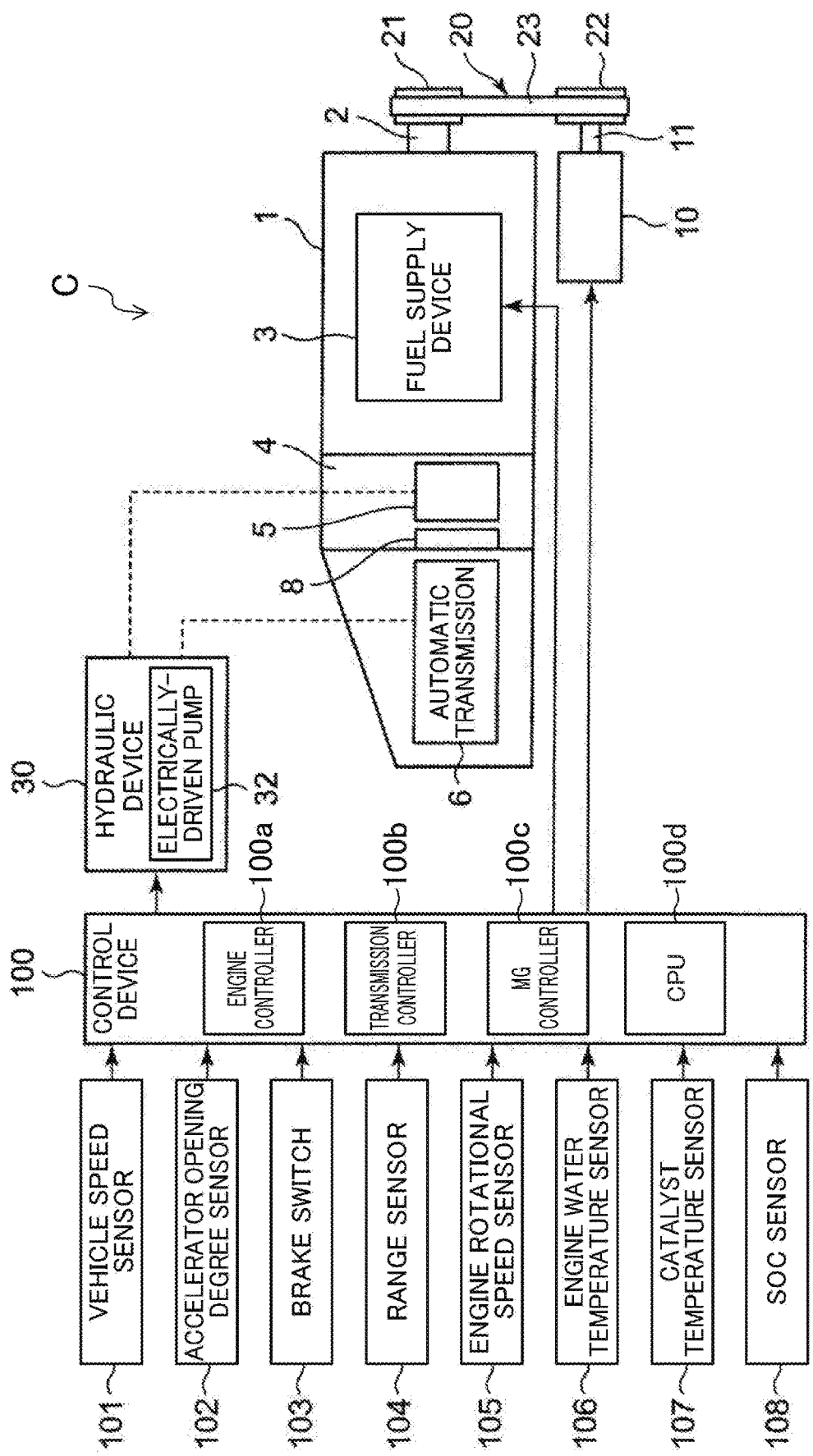
FIG. 1 is a schematic diagram showing configurations of a control system and a power transmission system in a control device for a multi-stage automatic transmission-equipped vehicle according to an example embodiment.

Example embodiments will now be described with reference to the accompanying drawings.
[Overall Configuration]
As shown in FIG. 1, a multi-stage automatic transmission-equipped vehicle (hereinafter referred to as a "vehicle") C including a control device 100 according to this embodiment has an internal combustion engine (hereinafter referred to as an "engine") 1 as a drive source, a multi-stage automatic transmission (hereinafter referred to as an "automatic transmission") 6 coupled to the engine 1 through a torque converter 4, and a motor-generator 10 which can drive the engine 1 to rotate.

The engine 1 is, for example, a gasoline engine or a diesel engine. The engine 1 has a crankshaft 2 and a fuel supply device 3.

The torque converter 4 has a lock-up clutch 5. When the lock-up clutch 5 is disengaged, the crankshaft 2 of the engine 1 is coupled to the input shaft of the automatic transmission 6 through hydraulic fluid of the torque converter 4. Meanwhile, when the lock-up clutch 5 is engaged, the crankshaft 2 is coupled directly to the input shaft of the automatic transmission 6 by the lock-up clutch 5.

A mechanical oil pump (hereinafter referred to as a "mechanical pump") 8 which is driven by the engine 1 through the torque converter 4 is provided between the torque converter 4 and the automatic transmission 6. The mechanical pump 8 is driven by rotation of the crankshaft 2.

The automatic transmission 6 has a hydraulic device 30 for controlling the automatic transmission 6 to change gear ratios (gear change control). The hydraulic device 30 includes an electrically-driven oil pump (hereinafter referred to as an "electrically-driven pump") 32 which is controlled by a transmission controller 100b described below, and a hydraulic circuit including a fluid path and a hydraulic control actuator such as a solenoid valve which opens and closes the fluid path. The hydraulic circuit is supplied, during running of the engine 1, with hydraulic power generated by the mechanical pump 8. Note that the hydraulic circuit of the hydraulic device 30 includes, in addition to the hydraulic circuit for the gear change control, a hydraulic circuit for controlling the lock-up clutch 5 (lock-up control).

The automatic transmission 6 changes power input from the engine 1 through the torque converter 4 and outputs the resultant power to a driven wheel. The automatic transmission 6 is, for example, a multi-stage automatic transmission having six forward gear ratios (stages) and one reverse gear ratio (stage). The automatic transmission 6 includes a plurality of (e.g., five) friction fastening elements (not shown) for changing power transmission paths. These friction fastening elements are selectively engaged by a hydraulic control performed by the transmission controller 100b through the hydraulic device 30, so that each gear ratio is achieved. Each gear ratio is, for example, achieved by engagement of two friction fastening elements.

Note that in this embodiment, the configuration of the automatic transmission 6 is not particularly limited, if the automatic transmission 6 is a multi-stage automatic transmission. Specifically, the number of gear ratios in the automatic transmission 6 and the number of friction fastening elements are not limited to those described above.

The motor-generator 10 has a rotating shaft 11 which is coupled to the crankshaft 2 through a wrapped transfer mechanism 20. The wrapped transfer mechanism 20 includes a pulley 21 which is provided at an end of the crankshaft 2 on the opposite side from the automatic transmission 6, a pulley 22 which is provided at a tip of the rotating shaft 11 of the motor-generator 10, and a belt 23 wrapped on the pulleys 21 and 22. The crankshaft 2 and the rotating shaft 11 are coupled together through the wrapped transfer mechanism 20 to rotate together.

Note that the belt 23 of the wrapped transfer mechanism 20 may be wrapped not only on the two pulleys 21 and 22, but also, for example, on a pulley (not shown) provided on the rotating shaft of an auxiliary device other than the engine 1 and the motor-generator 10, and an idling pulley (not shown) for adjusting the tension of the belt 23. Examples of the auxiliary device other than the engine 1 and the motor-generator 10 include an air-conditioning compressor, engine-cooling water pump, and brake-assisting vacuum pump.

When the motor-generator 10 is driven as an electrically-driven device (motor), the power of the motor-generator 10 is transmitted to the crankshaft 2 of the engine 1 through the wrapped transfer mechanism 20. Therefore, the motor-generator 10 can drive the crankshaft 2 of the engine 1 to rotate when the engine 1 is stopped, and can perform a torque assist to increase a torque output from the engine 1 to the driven wheel by adding power of the motor-generator 10 to the crankshaft 2 of the engine 1 when the engine 1 is running.

The motor-generator 10 is driven, for example, when the engine 1 is restarted during a vehicle-stopped-period idle stop control, and when torque assist is performed during the time that the vehicle C starts moving or accelerates. In addition, in this embodiment, even when a deceleration-period combustion stop control described below is being performed, the motor-generator 10 is driven, if necessary, so that the motor-generator 10 drives the crankshaft 2 of the engine 1 to rotate, i.e., the motor-generator 10 performs motoring.

Meanwhile, when the engine 1 is running, then if the motor-generator 10 is not being driven, the rotating shaft 11 of the motor-generator 10 is driven by the power of the engine 1 to rotate, so that the motor-generator 10 operates as a generator. In particular, during deceleration of the vehicle, a deceleration regeneration control is performed in which the motor-generator 10 operates as a generator. In the deceleration regeneration control, the motor-generator 10 generates electricity so that kinetic energy transferred from the driven wheel to the motor-generator 10 through the crankshaft 2 is converted into electric energy, i.e., energy recovery is performed.

[Control System]

Next, a control system for controlling an operation of each of the engine 1, the torque converter 4, the automatic transmission 6, and the motor-generator 10 will be described with reference to FIG. 1.

The vehicle C is equipped with the control device 100 for controlling these operations. The control device 100, which is a controller based on a well-known microcomputer, includes a central processing unit (CPU) 100*d* which executes a computer program (including a basic control program such as an operating system (OS), and an application program which runs on the OS to perform a specific function), memory including a ROM and a RAM, and an input/output (I/O) bus through which an electrical signal is inputted and outputted. The ROM stores various computer programs, and data used during execution of the computer program, etc. The RAM is memory in which a process area used when the CPU 100*d* performs a series of processes is provided.

In this embodiment, the control device 100 includes an engine controller 100*a* which controls the engine 1 including the fuel supply device 3, the transmission controller 100*b* which performs the gear change control of the automatic transmission 6 and the control of the lock-up clutch 5 of the torque converter 4 by control of the hydraulic control actuator provided in the hydraulic circuit of the hydraulic device 30, and an MG controller 100*c* which controls the motor-generator 10 (particularly, controls the operation of the motor-generator 10 as an electrically-driven device).

The engine controller 100*a*, the transmission controller 100*b*, and the MG controller 100*c* are executed to control respective objects to be controlled, by the CPU 100*d* processing signals required in processes in the respective controllers, of signals input to the control device 100, as described above, in accordance with a computer program stored in the ROM.

The engine controller 100*a* corresponds to a combustion controller which executes the deceleration-period combustion stop control described in detail below, and limits a combustion restart during the deceleration-period combustion stop control. The transmission controller 100*b* corresponds to a hydraulic power controller which controls hydraulic power supplied to the friction fastening elements of the automatic transmission 6. The MG controller 100*c* corresponds to a motoring controller which controls rotation of the engine 1 driven by the motor-generator 10.

The control device 100 receives signals from a vehicle speed sensor 101 which detects the velocity of the vehicle C, an accelerator opening degree sensor 102 which detects an accelerator pedal position (accelerator opening degree) of the driver of the vehicle C, a brake switch 103 which detects when the driver presses the brake pedal, a range sensor 104 which detects a range of the automatic transmission 6 selected by the driver, an engine rotational speed sensor 105 which detects the rotational speed of the engine 1, an engine water temperature sensor 106 which detects the temperature of cooling water for the engine 1, a catalyst temperature sensor 107 which detects the temperature of a catalyst device provided in an exhaust gas path for the engine 1, and a SOC sensor 108 which detects the state of charge of a battery used for, for example, driving the motor-generator 10.

Note that in addition to these inputs, the control device 100 may receive signals from various devices such as a turbine rotational speed sensor which detects the rotational speed of the turbine of the torque converter 4, an engine switch which is operated by the driver in order to start the engine 1, an oil temperature sensor which detects the temperature of oil used in lubrication and the hydraulic power control of the automatic transmission 6 and the torque converter 4, and an abnormality detection sensor (e.g., a hydraulic switch) which detects an abnormality in the hydraulic circuit of the hydraulic device 30.

The engine controller 100*a* outputs a control signal to the fuel supply device 3 of the engine 1 according to the input signals to control the combustion of the engine 1. For example, in the case where the fuel supply device 3 is equipped with an intake air amount control valve, an intake air amount and an injected fuel amount are regulated by controlling the opening degree of the intake air amount control valve, whereby the combustion of the engine 1 is controlled.

When the engine controller 100*a* is performing the deceleration-period combustion stop control and the vehicle-stopped-period idle stop control, the fuel supply device 3 is, for example, controlled so that the intake air amount control valve is closed and the fuel supply is stopped (fuel shut-off), and therefore, the combustion of the engine 1 is stopped. Thus, the combustion of the engine 1 is stopped when the vehicle C is decelerating or is stopped, in which situation a drive force is not required, and therefore, unnecessary fuel consumption is prevented or reduced, resulting in an improvement in fuel saving performance.

When the engine 1 is restarted from the idle stop state, the MG controller 100*c* drives the motor-generator 10 as a starter motor which restarts the engine 1. Furthermore, the MG controller 100*c* drives the motor-generator 10, if necessary, so that the motor-generator 10 performs motoring to drive the crankshaft 2 of the engine 1 to rotate during execution of the deceleration-period combustion stop control by the engine controller 100*a*.

The transmission controller 100*b* drives the electrically-driven pump 32, if necessary, when the engine controller 100*a* is performing the deceleration-period combustion stop control and the vehicle-stopped-period idle stop control.

The electrically-driven pump 32 is provided in the hydraulic circuit for the gear change control of the hydraulic device 30 to supply hydraulic power to a first-gear friction fastening element (start gear ratio friction fastening element) and a second-gear friction fastening element, of the plurality of friction fastening elements of the automatic transmission 6. The first and second gear friction fastening element are engaged when the gear ratio of the automatic transmission 6 is set to first gear and second gear, respectively. As a result, even in the situation that because the engine 1 is stopped or the rotational speed of the engine 1 (hereinafter referred to as an "engine rotational speed") is low, the discharge pressure of the mechanical pump 8 does not sufficiently rise, first gear and second gear can be achieved by driving the electrically-driven pump 32. Note that at least one of the plurality of friction fastening elements which are supplied with hydraulic power from the electrically-driven pump 32 is shared for first gear and second gear.

Based on the above input signals, the transmission controller 100b also outputs a control signal to the hydraulic device 30 (the hydraulic control actuator) which controls hydraulic power supply to the friction fastening elements of the automatic transmission 6 and the lock-up clutch 5. In the hydraulic device 30, the operation of the hydraulic control actuator is controlled so that the control of changing supply destinations of hydraulic power from the mechanical pump 8 or the electrically-driven pump 32, and the control of hydraulic power supplied to each friction fastening element of the automatic transmission 6 and the lock-up clutch 5, are performed. As a result, the gear change control of the automatic transmission 6 and the control (lock-up control) of the lock-up clutch 5 are performed.

The gear change control is performed according to, for example, a gear shifting diagram (not shown) specified based on vehicle speeds and accelerator opening degrees, and other various conditions, so that the automatic transmission 6 is put into a gear ratio corresponding to the vehicle C's running condition. Examples of such other conditions include whether or not the automatic transmission 6 is being cooled, whether or not there is an abnormality in the gear change control hydraulic circuit of the hydraulic device 30, and whether or not a diagnosis of such an abnormality is being performed. Therefore, upshifting to higher-speed gear ratios during cooling of the automatic transmission 6 may be limited, a gear change to a gear ratio involved with an abnormality in the gear change control hydraulic circuit during occurrence of the abnormality may be limited, or the gear change during diagnosis of an abnormality in the gear change control hydraulic circuit may be limited.

In some cases, hydraulic power used for the gear change control is supplied by the electrically-driven pump 32 as described above. Basically, such hydraulic power is supplied by the mechanical pump 8 rotating together with the crankshaft 2 of the engine 1. Hydraulic power required for power transmission of the friction fastening elements of the automatic transmission 6 varies from friction fastening element to friction fastening element. Even the same friction fastening element requires different hydraulic powers for different gear ratios. Therefore, hydraulic power that should be supplied to each friction fastening element for engagement or preparation for engagement varies from gear ratio to gear ratio. Even when the automatic transmission 6 is put into any gear ratio, if the engine 1 is rotating at a rotational speed higher than or equal to an idle rotational speed N0, the required hydraulic power is discharged by the mechanical pump 8.

The lock-up clutch 5 is controlled according to, for example, the vehicle speed and other various conditions. Basically, the lock-up clutch 5 is disengaged at less than a predetermined vehicle speed, and is controlled to be actuated (engaged or slipped) at the predetermined vehicle speed or higher. Examples of conditions other than vehicle speed include whether or not the automatic transmission 6 and/or the torque converter 4 are being cooled, whether or not there is an abnormality in the lock-up control hydraulic circuit of the hydraulic device 30, and whether or not a diagnosis of such an abnormality is being performed. Therefore, the actuation of the lock-up clutch 5 may be limited when the automatic transmission 6 and/or the torque converter 4 are being cooled, and when there is an abnormality in the lock-up control hydraulic circuit or the diagnosis thereof is being performed. Hydraulic power used for controlling the lock-up clutch 5 is supplied by the mechanical pump 8 being driven by rotation of the engine 1.

[Deceleration-Period Combustion Stop Control]

If a predetermined combustion stop condition is satisfied when the vehicle C is traveling, the engine controller 100a controls the fuel supply device 3 to execute the deceleration-period combustion stop control to stop the combustion of the engine 1.

Concerning the deceleration-period combustion stop control, the predetermined combustion stop condition includes a plurality of conditions. If all the plurality of conditions are satisfied when the vehicle C is traveling, the predetermined combustion stop condition is satisfied. If not all the plurality of conditions are satisfied, i.e., at least one of the plurality of conditions is unsatisfied, the combustion stop control of the engine 1 is not performed.

Specific examples of the predetermined combustion stop condition for the deceleration-period combustion stop control include:

the range of the automatic transmission 6 is a D range (forward range);

the acceleration operation is off (the accelerator pedal is not pressed);

the engine rotational speed is higher than or equal to a predetermined reference rotational speed N1;

the engine 1 is not being cooled (specifically, for example, the temperature of cooling water for the engine 1 is higher than or equal to a predetermined temperature, and/or the temperature of a catalyst device provided in an exhaust gas path of the engine 1 is higher than or equal to a predetermined temperature);

a sensor for detecting whether or not the engine 1 is being cooled (e.g., the engine water temperature sensor 106 and/or the catalyst temperature sensor 107) is being normally operated; and the state of charge of the battery is greater than or equal to a predetermined amount, the air-conditioning device is not in a high load state, and restoration of a diesel particulate filter (DPF) is not being performed in the case where the engine 1 is a diesel engine.

[Combustion Restart Control]

If a predetermined combustion restart condition is satisfied when the deceleration-period combustion stop control is being performed, the engine controller 100a performs a combustion restart control to restart the combustion of the engine 1. In the combustion restart control, the combustion of the engine 1 is restarted by the fuel supply device 3 resuming fuel supply.

The predetermined combustion restart condition includes a plurality of conditions. If at least one of the plurality of conditions is satisfied, the combustion restart condition is satisfied.

Specific examples of the predetermined combustion restart condition include:

the engine rotational speed is lower than or equal to a predetermined restart rotational speed N2 (rotational speed which is lower than the reference rotational speed N1 and higher than the normal idle rotational speed N0);

the range of the automatic transmission 6 is changed to a range other than the D range;

the acceleration operation is on (the accelerator pedal is pressed);

the engine 1 is being cooled;

the state of charge of the battery is less than the predetermined amount;

the air-conditioning device is in a high load state; and restoration of a diesel particulate filter (DPF) is performed in the case where the engine 1 is a diesel engine.

[Control Operation]

An example control operation of the control device 100 will be described with reference to a flowchart shown in FIG. 2.

Figure 2:
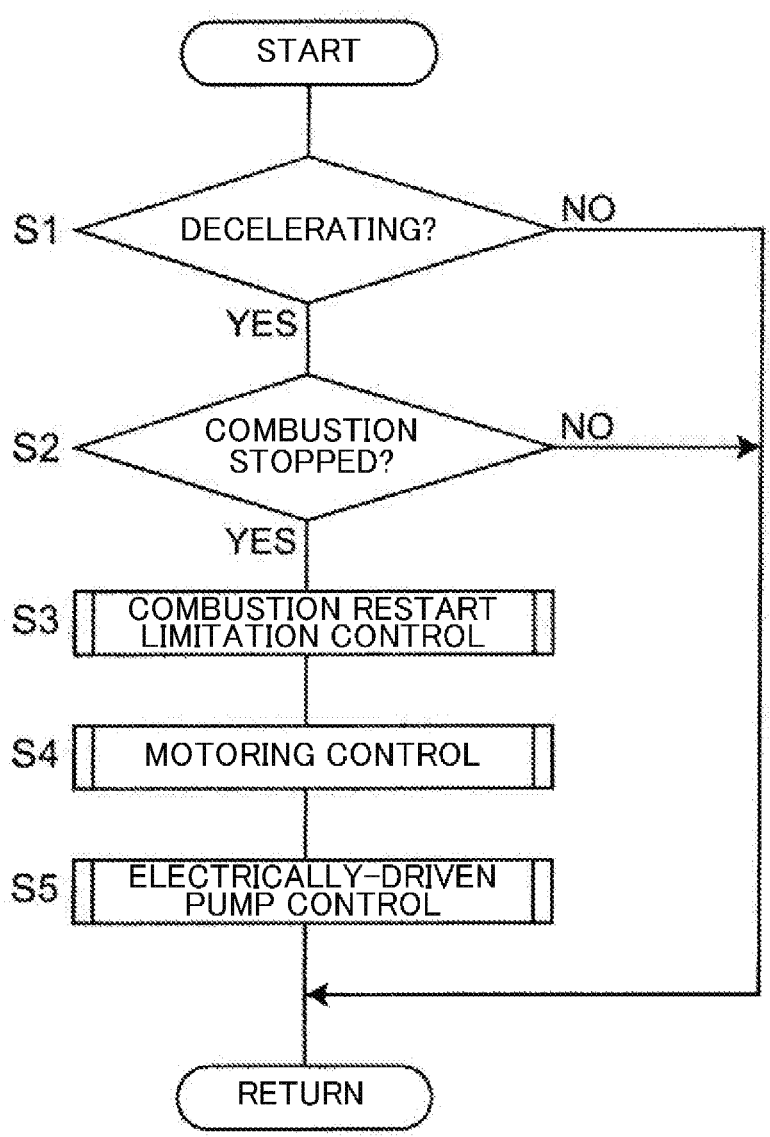
FIG. 2 is a flowchart showing an example control operation performed by the control device.

The control operation of FIG. 2 is repeatedly performed when the engine switch is on. During execution of the control operation of FIG. 2, control involved with the combustion of the engine 1, control of the automatic transmission 6, and control of the lock-up clutch 5 are performed in parallel by the control device 100.

In step S1, it is determined whether or not the vehicle C is decelerating. In step S2, it is determined whether or not the combustion of the engine 1 is stopped. The determination of step S1 is performed, for example, based on an input signal from the vehicle speed sensor 101 (see FIG. 1). The determination of step S2 is performed based on the presence or absence of execution of the deceleration-period combustion stop control.

If the results of the determination of step S1 and S2 indicate that the vehicle C is decelerating and the combustion of the engine 1 is stopped, i.e., if the deceleration-period combustion stop control is being performed, the engine controller 100a performs a combustion restart limitation control in step S3, the MG controller 100c performs motoring control in step S4, and the transmission controller 100b performs electrically-driven pump control in step S5.

The combustion restart limitation control (step S3), the motoring control (step S4), and the electrically-driven pump control (step S5) are performed in order to achieve downshifting according to a reduction in vehicle speed while continuing the deceleration-period combustion stop control. A control operation of each of the combustion restart limitation control (step S3), the motoring control (step S4), and the electrically-driven pump control (step S5) will be described below.

Meanwhile, if the result of the determination of step S1 indicates that the vehicle C is not decelerating, and if the determination of step S2 indicates that the combustion of the engine 1 is not stopped, none of the combustion restart limitation control (step S3), motoring control (step S4), and electrically-driven pump control (step S5) is performed.

If the deceleration-period combustion stop control is not being performed when the vehicle C is traveling, the engine 1 normally rotates at a rotational speed higher than or equal to the idle rotational speed N0, and therefore, the mechanical pump 8 generates sufficient hydraulic power for appropriately performing gear change in the automatic transmission 6. Therefore, in this case, the gear change control can be appropriately performed using the hydraulic power of the mechanical pump 8 according to running condition even without execution of the combustion restart limitation control (step S3), the motoring control (step S4), or the electrically-driven pump control (step S5).

Note that when the vehicle-stopped-period idle stop control is performed by the engine controller 100a in the state that the vehicle C is stopped, the electrically-driven pump 32 is driven so that hydraulic power is supplied from the electrically-driven pump 32 to the start gear ratio friction fastening element, and therefore, a good start response is obtained when the engine 1 is restarted in response to a request to start moving from the driver of the vehicle C. When the vehicle-stopped-period idle stop control is not performed in the state that the vehicle C is stopped, the rotational speed of the engine 1 is maintained at the idle rotational speed N0, and therefore, hydraulic power is appropriately supplied from the mechanical pump 8 to the start gear ratio friction fastening element, resulting in a good start response.

[Combustion Restart Limitation Control]

An example control operation of the combustion restart limitation control (step S3 of FIG. 2) by the control device 100 (engine controller 100a) will be described with reference to a flowchart shown in FIG. 3.

In the combustion restart limitation control, in step S31, the presence or absence of a vehicle stop request made by the driver of the vehicle C pressing the brake pedal is determined based on an input signal from the brake switch 103 (see FIG. 1).

If the result of the determination of step S31 indicates the presence of the vehicle stop request made by the driver pressing the brake pedal, in step S32 the execution of the combustion restart control, which is triggered by a reduction in engine rotational speed, is forbidden. Specifically, in the combustion restart control, one of the plurality of conditions included in the predetermined combustion restart condition that the engine rotational speed is lower than or equal to the predetermined restart rotational speed N2 (hereinafter referred to as a "restart rotational speed condition") is made unsatisfied.

Thus, when the deceleration-period combustion stop control is performed during deceleration for stopping the vehicle C, then if combustion restart which is triggered by a reduction in engine rotational speed is forbidden, the vehicle can come to stop with the combustion of the engine 1 maintained stopped. When the vehicle comes to stop after such an idle stop state during deceleration, the vehicle-stopped-period idle stop control can continue to be performed. In this case, a continuous combustion-stopped state can be achieved from the time that the deceleration-period combustion stop control is started when the vehicle C is traveling until the engine 1 is put into an idle stop state when the vehicle is stopped, and then restarts in response to a request to start moving again made by the driver, for example. As a result, the fuel saving performance can be effectively improved.

Meanwhile, if the result of the determination of step S31 indicates the absence of a vehicle stop request from the driver during execution of the deceleration-period combustion stop control, in step S33 the combustion restart control is permitted under the normal combustion restart condition (i.e., the predetermined combustion restart condition) including the restart rotational speed condition. In this case, the combustion of the engine 1 is restarted when the engine rotational speed decreases to the predetermined restart rotational speed N2, and therefore, engine stall can be avoided.

[Motoring Control]

Figure 4:
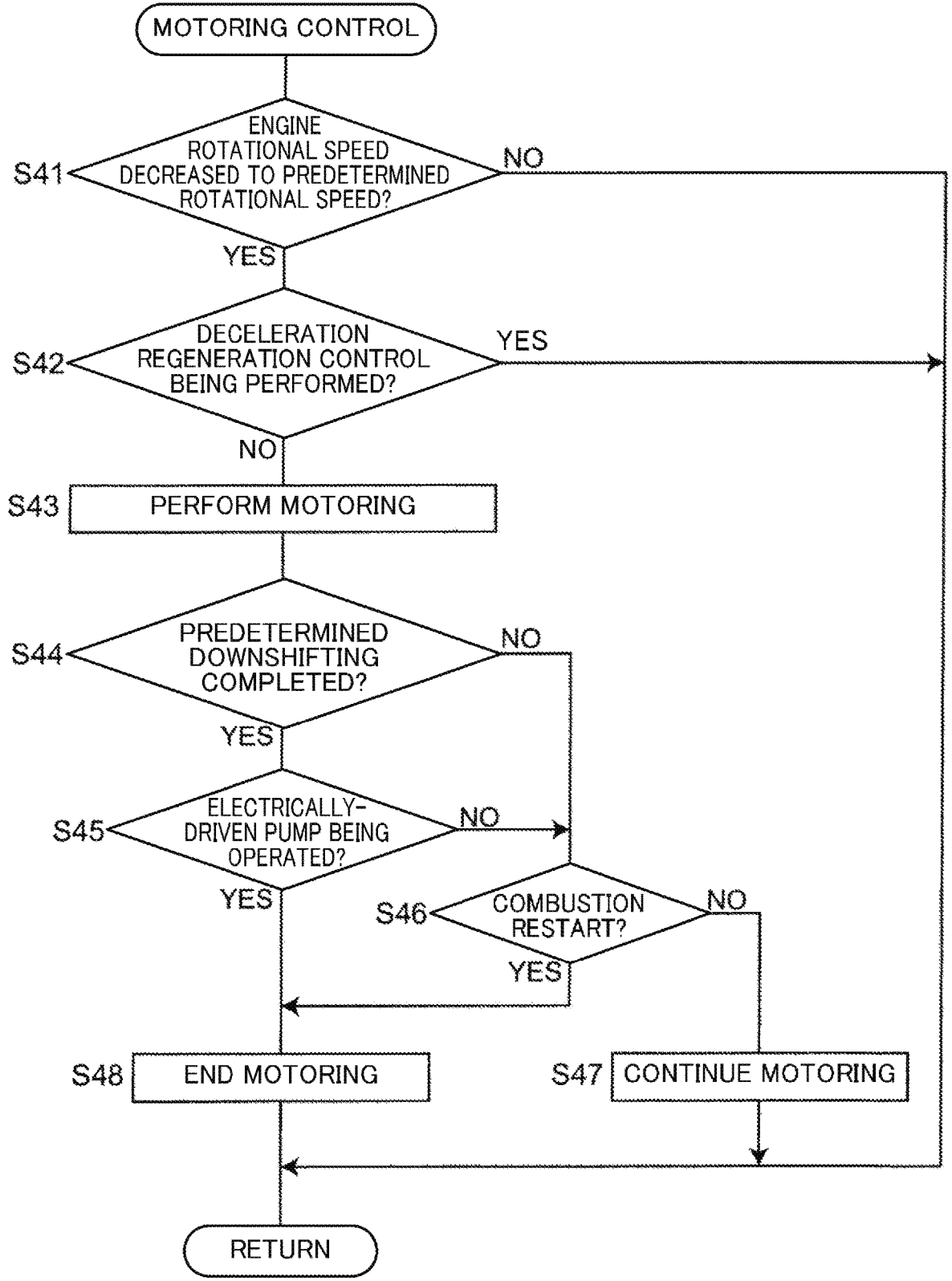
FIG. 4 is a flowchart showing an example control operation performed by a motoring control.

An example control operation of the motoring control (step S4 of FIG. 2) by the control device 100 (MG controller 100c) will be described with reference to a flowchart shown in FIG. 4.

Initially, in step S41, it is determined whether or not the engine rotational speed has decreased to a predetermined rotational speed, for example, based on an input signal from the engine rotational speed sensor 105 (see FIG. 1). Here, the "predetermined rotational speed" refers to the normal idle rotational speed N0, for example. The normal idle rotational speed N0 means an idle rotational speed in the absence of an idle up. Note that the predetermined rotational speed in step S41 may be any rotational speed that is lower than the predetermined restart rotational speed N2, except for the normal idle rotational speed N0.

If the result of the determination of step S41 indicates that the engine rotational speed is higher than the predetermined rotational speed, a return occurs without the motor-generator 10 driving the crankshaft 2 to rotate (motoring for the engine 1). In this case, the mechanical pump 8 generates sufficient hydraulic power required for appropriately performing the gear change control, without the need of execution of motoring for the engine 1.

Meanwhile, if the result of the determination of step S41 indicates that the engine rotational speed is lower than or equal to the predetermined rotational speed, in step S42 the presence or absence of execution of the deceleration regeneration control is determined.

If the result of the determination of step S42 indicates that the deceleration regeneration control is being performed, the motor-generator 10 is operating as a generator, and therefore, a return occurs without motoring for the engine 1.

Meanwhile, if the results of the determination of steps S41 and S42 indicate that the engine rotational speed has decreased to the predetermined rotational speed during execution of the deceleration-period combustion stop control, and the deceleration regeneration control is not being performed, in step S43 the motor-generator 10 is driven as an electrically-driven device to drive the crankshaft 2 to rotate, i.e., the motor-generator 10 performs motoring. In the motoring for the engine 1 of step S43, an operation of the motor-generator 10 as an electrically-driven device is controlled so that the engine rotational speed is maintained at the predetermined rotational speed of step S41, i.e., the normal idle rotational speed N0.

Note that the engine rotational speed achieved by the motoring of step S43 may be controlled to a rotational speed different from the normal idle rotational speed N0, or may be controlled to a rotational speed different from the predetermined rotational speed as the reference for the determination of step S41, if the mechanical pump 8 can generate hydraulic power required for normal hydraulic control of the automatic transmission 6.

In this embodiment, a gear ratio that may be employed during execution of the deceleration-period combustion stop control is mainly second gear or third gear. Therefore, the engine rotational speed achieved by the motoring of step S43 is preferably controlled so that the mechanical pump 8 can generate hydraulic power which is greater than or equal to a minimum hydraulic power required for engagement of the second-gear and third-gear friction fastening elements.

In addition, in order to reduce power consumption of the motor-generator 10, the motoring of step S43 is preferably controlled so that the engine rotational speed does not become higher than necessary, and the engine rotational speed is preferably lower than at least the predetermined restart rotational speed N2.

Therefore, if the engine rotational speed achieved by the motoring of step S43 is similar to the normal idle rotational speed N0, an appropriate gear change control can be achieved using the hydraulic power of the mechanical pump 8 while reducing power consumption.

The motoring for the engine 1, which has been started at step S43, is ended, depending on the results of determination of following steps S44-S46.

In step S44, it is determined whether or not predetermined downshifting (downshifting to a predetermined gear ratio) has been completed (whether or not engagement of a predetermined friction fastening element has been completed and disengagement of another friction fastening element has been completed). More specifically, in this embodiment, it is determined whether or not downshifting from third gear to second gear has been completed.

In step S45, it is determined whether or not the electrically-driven pump 32 is being operated in the electrically-driven pump control.

If the result of the determination of step S44 indicates that the predetermined downshifting has not been completed, and if the predetermined downshifting has been completed, and the result of the determination of step S45 indicates that the electrically-driven pump 32 is not being operated, in step S46 it is determined whether or not combustion restart has been performed by the combustion restart control, i.e., whether or not the deceleration-period combustion stop control has been ended.

If the result of the determination of step S46 indicates that combustion restart has not been performed, i.e., the deceleration-period combustion stop control is being continued, in step S47 the motoring for the engine 1 (crankshaft 2) is continued.

Meanwhile, if the results of the determination of steps S44 and S45 indicate that the predetermined downshifting has been completed, and the operation of the electrically-driven pump 32 has been started, in step S48 the motoring for the engine 1 (crankshaft 2) is ended.

As described above, the engine rotational speed is maintained at a predetermined rotational speed by motoring for the engine 1 performed from the time that the engine rotational speed decreases to the predetermined rotational speed until downshifting to the second gear is completed while the deceleration-period combustion stop control is continued during deceleration for stopping the vehicle C. Therefore, the combustion-stopped state is continued until the vehicle C comes to stop, resulting in an improvement in fuel saving performance, and a normal gear change control employing hydraulic power generated by the mechanical pump 8 can achieve normal downshifting according to a reduction in vehicle speed.

In addition, even when a predetermined downshifting has not been completed, or when the electrically-driven pump 32 has not been actuated, then if the result of the determination of step S46 indicates that the deceleration-period combustion stop control has been ended, in step S48 the motoring for the engine 1 is ended. In this case, combustion restart is performed so that the engine 1 rotates at a speed that is higher than or equal to the idle rotational speed N0, and therefore, the mechanical pump 8 can generate sufficient hydraulic power for the appropriate gear change control without motoring for the engine 1.

[Electrically-Driven Pump Control]

Figure 5:
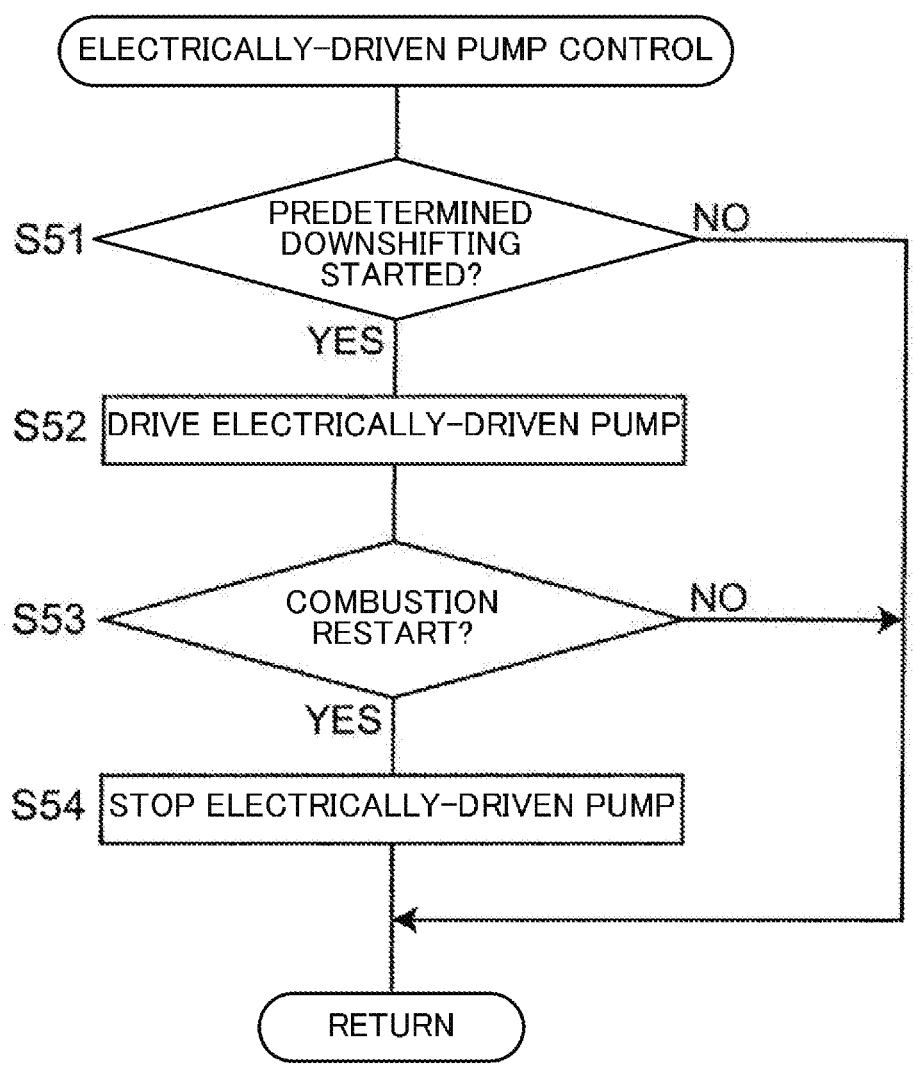
FIG. 5 is a flowchart showing an example control operation performed by an electrically-driven pump control.

An example control operation of the electrically-driven pump control (step S5 of FIG. 2) performed by the control device 100 (MG controller 100c) will be described with reference to a flowchart shown in FIG. 5.

In the electrically-driven pump control, in step S51 it is determined whether or not the predetermined downshifting (downshifting to a predetermined gear ratio), more specifically downshifting from third gear to second gear, has been started.

If the result of the determination of step S51 indicates that downshifting to second gear has not been started, the control operation returns without starting operation of the electrically-driven pump 32. Thus, the electrically-driven pump 32 is maintained stopped until downshifting to second gear is started, and therefore, power consumption is prevented or reduced.

Meanwhile, if the result of the determination of step S51 indicates that downshifting to second gear has been started, in step S52 the electrically-driven pump 32 is driven. In this embodiment, when downshifting to second gear is started, the electrically-driven pump 32 starts to be driven. Note that the electrically-driven pump 32 may start to be driven during downshifting to second gear or after completion of downshifting to second gear.

The discharge pressure of the electrically-driven pump 32 thus caused to rise can be supplied to the second-gear friction fastening element. Therefore, even if the motoring for the engine 1 is ended after completion of downshifting to second gear in the motoring control (step S48 of FIG. 4), hydraulic power is supplied from the electrically-driven pump 32 to the second-gear friction fastening element, and therefore, the second-gear state can be maintained in the automatic transmission 6. As a result, deceleration can be continued with second gear for stopping the vehicle by utilizing the hydraulic power of the electrically-driven pump 32 while power consumption is prevented or reduced by ending the motoring for the engine 1.

When downshifting to second gear is completed, the hydraulic chamber of the second-gear friction fastening element has already been filled with hydraulic fluid supplied from the mechanical pump 8. Therefore, the electrically-driven pump 32 may output hydraulic power that only compensates for a reduction in hydraulic power in the hydraulic chamber caused by the stoppage of the mechanical pump 8. Therefore, even when the electrically-driven pump 32 is driven in order to maintain the second-gear state, power consumption can be more effectively prevented or reduced than when the motoring for the engine 1 is continued.

[Example Operations]

A specific example of changes over time in each of the control operations of FIGS. 2-5 will now be described with reference to a time chart shown in FIG. 6. The time chart of FIG. 6 shows an example of each operation performed from the time that the deceleration-period combustion stop control is started until the vehicle C comes to stop and then starts moving.

Figure 6:
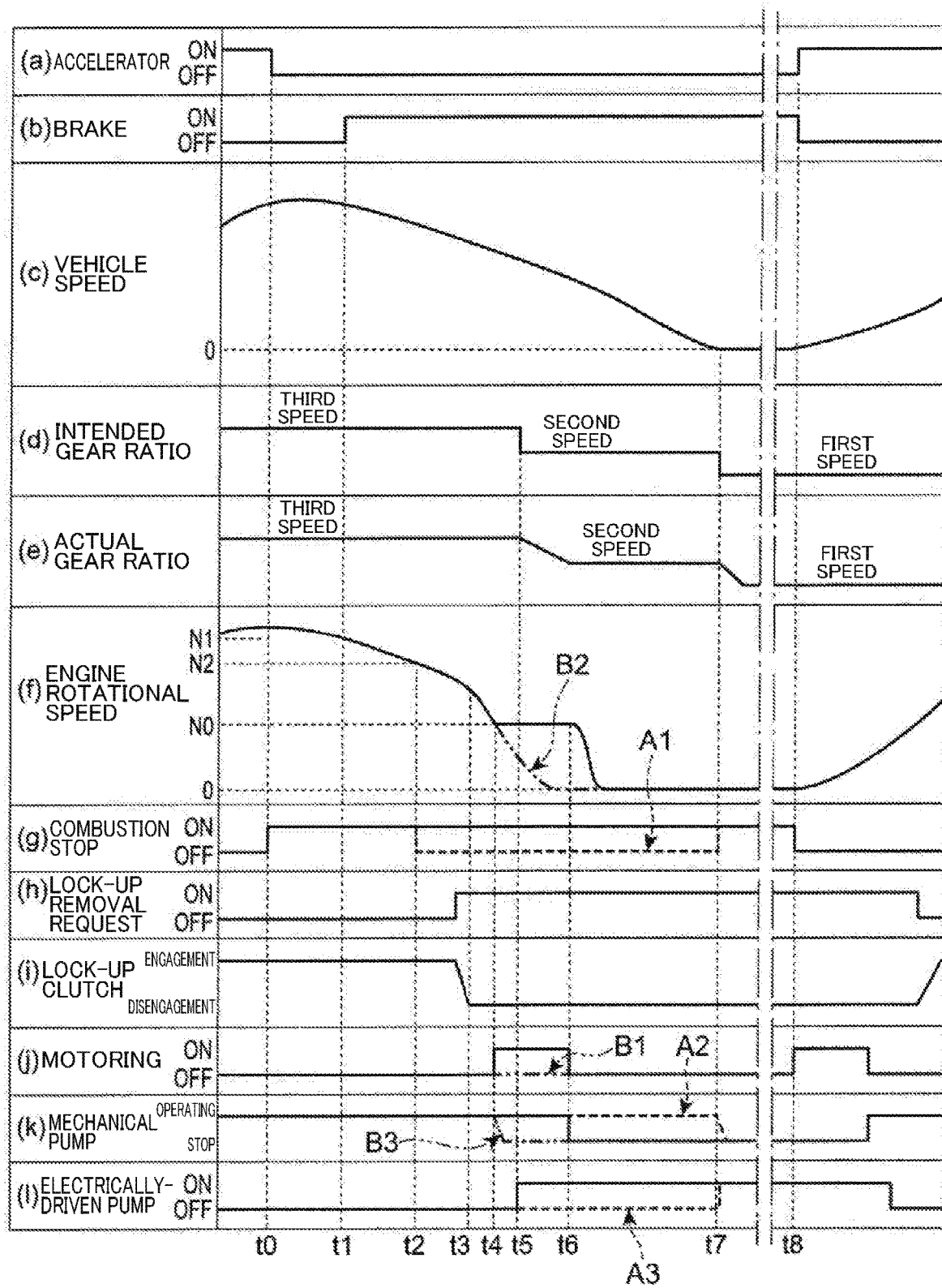
FIG. 6 is a time chart showing an example of each operation performed from the time that a deceleration-period combustion stop control is started until a vehicle comes to a stop and then starts moving.

In the example of FIG. 6, at time t0, the vehicle C is traveling with the gear ratio of the automatic transmission 6 put into third gear (see field (e)) and the lock-up clutch 5 engaged (see field (i)). At time t0, pressing of the accelerator pedal is removed (see field (a)), so that the deceleration-period combustion stop control is started (see field (g)).

As a result, the vehicle C decelerates (see field (c)), so that the engine rotational speed gradually decreases with a decrease in vehicle speed (see field (f)).

Figure 3:
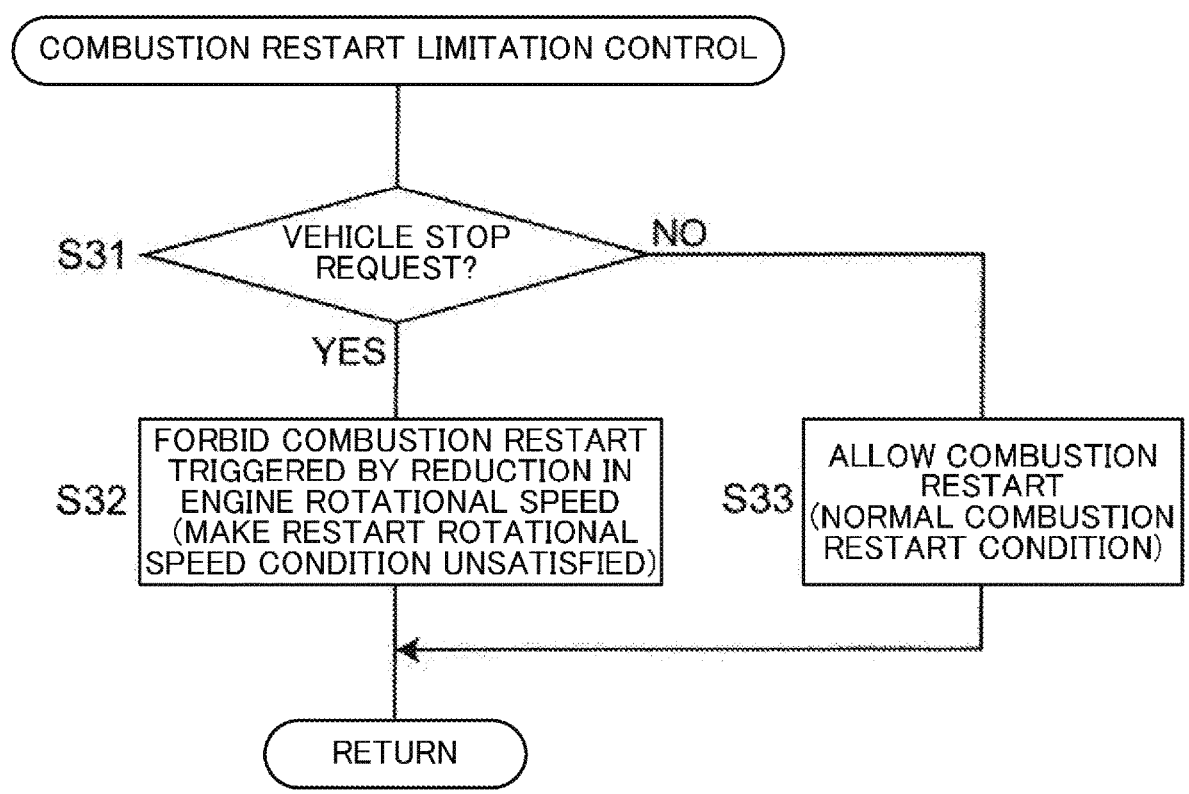
FIG. 3 is a flowchart showing an example control operation performed by a combustion restart limitation control.

Thereafter, at time t1, the brake pedal is pressed (see field (b)), so that the restart rotational speed condition is made unsatisfied by the combustion restart limitation control (step S32 of FIG. 3). As a result, at time t2, even when the engine rotational speed decreases to the predetermined restart rotational speed N2, the combustion-stopped state is continued without execution of the combustion restart control (see field (g)).

The combustion-stopped state may be continued until the vehicle C comes to stop at time t7, is then put into the vehicle-stopped-period idle stop state, and then starts moving again at time t8 (see field (g)). Therefore, fuel saving performance can be more effectively improved than in a first comparative example in which combustion restart is performed during deceleration for stopping the vehicle as indicated by a reference character A1 of FIG. 6.

Note that in the operation of the first comparative example, as indicated by a reference character A2, the mechanical pump 8 continues to be operated until the vehicle C comes to stop, and therefore, the automatic transmission 6 performs normal downshifting using the hydraulic power of the mechanical pump 8. In addition, in the first comparative example, as indicated by a reference character A3, the electrically-driven pump 32 is not driven, until the vehicle C comes to stop, and when the vehicle-stopped-period idle stop control is performed, the electrically-driven pump 32 is driven in order to supply hydraulic power to the start gear ratio friction fastening element.

In this embodiment, if a lock-up removal request is made in response to a reduction in vehicle speed during execution of the combustion restart limitation control (see field (h)), the lock-up clutch 5 is disengaged at time t3 (see field (i)). As a result, the direct engagement of the crankshaft 2 with the driven wheel is removed, so that the engine rotational speed rapidly decreases from time t3 (see field (f)).

At time t4, if the engine rotational speed decreases to the idle rotational speed N0 (see field (f)), motoring for the engine 1 is performed (step S43 of FIG. 4) (see field (j)).

In an operation of a second comparative example in which motoring is not performed as indicated by a reference character B1, the rapid decrease of the engine rotational speed continues, and the engine rotation eventually come to a complete stop as indicated by a reference character B2. As a result, as indicated by a reference character B3, the operation of the mechanical pump 8 comes to a stop, and therefore, the normal gear change control employing the hydraulic power of the mechanical pump 8 can no longer be performed.

In contrast to this, in this embodiment, at time t4, motoring for the engine 1 is performed, so that the engine rotational speed is maintained at the idle rotational speed N0 (see field (f)), and therefore, the operation of the mechanical pump 8 can be continued (see field (k)). As a result, the gear ratio of the automatic transmission 6 is maintained at third gear (see field (e)).

Thereafter, when a request for downshifting from third gear to second gear is made in response to a reduction in vehicle speed at time t5 (see field (d)), the downshifting is performed from time t5 to time t6 (see field (e)). At this time, the operating state of the mechanical pump 8 is maintained by motoring for the engine 1 (see field (k)), and therefore, downshifting from third gear to second gear can be normally performed.

In addition, when downshifting to second gear is started at time t5, the electrically-driven pump 32 starts to be driven (see field (l)). As a result, the discharge pressure of the electrically-driven pump 32 is caused to rise during the downshifting. Therefore, after the motoring for the engine 1 is ended at time t6 and therefore the operation of the mechanical pump 8 comes to stop, the second-gear state of the automatic transmission 6 can be maintained using the hydraulic power of the electrically-driven pump 32.

In the example operation of FIG. 6, when the vehicle C comes to stop at time t7, the vehicle-stopped-period idle stop control is performed. During the vehicle-stopped-period idle stop control, hydraulic power generated by the electrically-driven pump 32 is supplied to the start gear ratio friction fastening element, so that the start gear ratio friction fastening elements are put into an engaged state or a ready-to-be-engaged state.

Thereafter, when the pressing of the brake pedal is removed at time t8 (see field (b)), and then the accelerator pedal is pressed (see field (a)), the vehicle-stopped-period idle stop control is ended in response to that request to start moving. As a result, the motor-generator 10 is driven (see field (j)) so that the engine 1 is restarted (see field (g)). At this time, a good start response can be obtained because the start gear ratio friction fastening element is previously put into an engaged state or a ready-to-be-engaged state.

In the above example operation of FIG. 6, the combustion-stopped state is continued not only during a period of time from the time that the deceleration-period combustion stop control is started until the vehicle C comes to stop, but also during a period of time from the vehicle C comes to stop until the vehicle-stopped-period idle stop control ends. Therefore, fuel saving performance can be effectively improved.

In addition, during deceleration in third gear, the motor-generator 10 performs motoring for the engine 1 (crankshaft 2) only during a period of time from the time that the engine rotational speed decreases to the idle rotational speed N0 until downshifting to second gear is completed. As a result, normal downshifting according to a reduction in vehicle speed can be achieved while the deceleration-period combustion stop control is performed. The period of time for which the motor-generator 10 is operated to perform motoring for the engine 1 is substantially several seconds, and therefore, the power consumption of the motor-generator 10 is reduced to the extent possible.

Furthermore, after downshifting to second gear is completed, the electrically-driven pump 32, which has lower power consumption than that of the motor-generator 10, is used to maintain second gear. As a result, deceleration can be continued in second gear until the vehicle C comes to stop, with minimized power consumption.

Furthermore, the automatic transmission 6 is always put into a gear ratio corresponding to vehicle speed from the time that the deceleration-period combustion stop control is started until the vehicle C comes to stop. Therefore, even when combustion restart is performed according to a request for re-acceleration, a good acceleration response is obtained, and in addition, the pressing of the accelerator pedal in the neutral state is prevented or reduced, and therefore, the no-load revving of the engine 1 can be prevented or reduced.

The present invention is not limited to the above embodiments, and substitutions can be made without departing the scope of the appended claims.

For example, although in the above embodiments, combustion restart triggered by a reduction in engine rotational speed is limited when the driver's vehicle stop request is made during execution of the deceleration-period combustion stop control, even the restart condition that combustion restart is performed if the engine rotational speed is lower than or equal to a predetermined restart rotational speed may not be set.

The above embodiments are merely illustrative and considered as not restrictive. The scope of the present invention is defined by the appended claims. All variations and modifications falling within the equivalency range of the appended claims are intended to be embraced therein.

INDUSTRIAL APPLICABILITY

The present invention is useful for a control device for a multi-stage automatic transmission-equipped vehicle having a multi-stage automatic transmission including a plurality of friction fastening elements which can be engaged using hydraulic power supplied from a mechanical oil pump which is driven by rotation of an internal combustion engine.

DESCRIPTION OF REFERENCE CHARACTERS

C VEHICLE
1 ENGINE (INTERNAL COMBUSTION ENGINE)
2 CRANKSHAFT
6 MULTI-STAGE AUTOMATIC TRANSMISSION
8 MECHANICAL OIL PUMP
10 MOTOR GENERATOR (MOTOR)
30 HYDRAULIC DEVICE
32 ELECTRICALLY-DRIVEN OIL PUMP
100 CONTROL DEVICE
100*a* ENGINE CONTROLLER (COMBUSTION CONTROLLER)
100*b* TRANSMISSION CONTROLLER (HYDRAULIC POWER CONTROLLER)
100*c* MG CONTROLLER (MOTORING CONTROLLER)

The invention claimed is:
1. A control device for a multi-stage automatic transmission-equipped vehicle having an internal combustion engine, a mechanical oil pump configured to be driven by rotation of the internal combustion engine, a multi-stage automatic transmission including a plurality of friction fastening elements configured to be engaged using hydraulic power supplied from the mechanical oil pump, and a motor configured to drive the internal combustion engine to rotate, the control device comprising:
 a processor configured to execute:
  a hydraulic power controller to control the hydraulic power supplied to the friction fastening elements;
  a combustion controller to, if a predetermined combustion stop condition is satisfied when the vehicle is traveling, perform a deceleration-period combustion stop control to stop combustion of the internal combustion engine, and limit combustion restart triggered by a reduction in rotational speed of the internal combustion engine, during execution of the deceleration-period combustion stop control; and
  a motoring controller to control the rotational drive of the internal combustion engine by the motor during execution of the deceleration-period combustion stop control so that the rotational speed of the internal combustion engine is maintained at a predetermined rotational speed during a period of time from the time that the rotational speed of the internal combustion engine decreases to the predetermined rotational speed until downshifting to a predetermined gear ratio is completed.

2. The control device of claim 1, wherein
the multi-stage automatic transmission has an electrically-driven oil pump configured to supply hydraulic power to a predetermined one of the plurality of friction fastening elements configured to be engaged when the gear ratio of the multi-stage automatic transmission is put into the predetermined gear ratio, and
the hydraulic power controller supplies hydraulic power from the electrically-driven oil pump to the predetermined friction fastening element, during execution of the deceleration-period combustion stop control, after downshifting to the predetermined gear ratio is completed.

3. The control device of claim 2, wherein
the motoring controller stops the rotational drive of the internal combustion engine by the motor after downshifting to the predetermined gear ratio is completed and the electrically-driven oil pump starts to be driven.

4. The control device of claim 1, wherein
the combustion controller is configured to cause the internal combustion engine to restart combustion when the rotational speed of the internal combustion engine decreases to a predetermined restart rotational speed higher than the predetermined rotational speed during execution of the deceleration-period combustion stop control, and limit the combustion restart of the internal combustion engine triggered by the rotational speed of the internal combustion engine becoming lower than or equal to the predetermined restart rotational speed, when a vehicle stop request is made by a driver pressing a brake pedal of the vehicle during execution of the deceleration-period combustion stop control.

* * * * *